US012772038B2

(12) United States Patent
Kant

(10) Patent No.: US 12,772,038 B2
(45) Date of Patent: Oct. 20, 2026

(54) SYSTEM AND METHOD FOR DYNAMIC eSIM ORCHESTRATION ACROSS MULTI VENDOR PLATFORMS

(71) Applicant: Nishi Kant, Pleasanton, CA (US)

(72) Inventor: Nishi Kant, Pleasanton, CA (US)

( * ) Notice: Subject to any disclaimer, the term of this patent is extended or adjusted under 35 U.S.C. 154(b) by 2 days.

(21) Appl. No.: 19/439,371

(22) Filed: Jan. 4, 2026

(65) Prior Publication Data

US 2026/0214432 A1 Jul. 23, 2026

(51) Int. Cl.
*H04W 8/18* (2009.01)

(52) U.S. Cl.
CPC .................................... *H04W 8/18* (2013.01)

(58) Field of Classification Search
CPC ...................................................... H04W 8/18
USPC ......................................................... 455/418
See application file for complete search history.

(56) References Cited

U.S. PATENT DOCUMENTS 11,678,176 B1 * 6/2023 Uehling ................ H04W 12/43
370/329
11,769,167 B1 * 9/2023 Esclusa .................. G06Q 20/02
705/14.25
2019/0028881 A1 * 1/2019 Namiranian ......... H04B 1/3816
2019/0159016 A1 * 5/2019 Zhang ................... H04W 8/183
2020/0228488 A1 * 7/2020 Xu ....................... H04L 61/4588
2022/0369094 A1 * 11/2022 Rajwar ................... H04W 4/14
2025/0330800 A1 * 10/2025 Ståhl ....................... H04W 8/20

* cited by examiner

*Primary Examiner* — Don N Vo

(57) ABSTRACT

A backend orchestration system dynamically manages eSIM profile deployment across multiple SM-DP+ platforms. It enables bulk procurement of profiles decoupled from devices or users and maintains logical metadata pools for later allocation. Upon deployment requests from operators or enterprises, it applies policy-based rules to select appropriate SM-DP+ servers, issues standard DownloadOrder and ConfirmOrder commands, and only triggers subscriber provisioning in a Home Subscriber Server/Unified Data Manager or Connectivity Management Platform after allocation. For consumer devices, it generates activation QR codes; for IoT, it provides metadata to an eSIM IoT Manager for remote triggering. The system avoids storing cryptographic keys and supports GSMA-standard interfaces. Its analytics and adaptive policy engine optimize inventory usage, minimize vendor lock-in, and enable dynamic, cross-vendor load balancing.

20 Claims, 6 Drawing Sheets

Logical representation of entities in eSIM profile orchestration

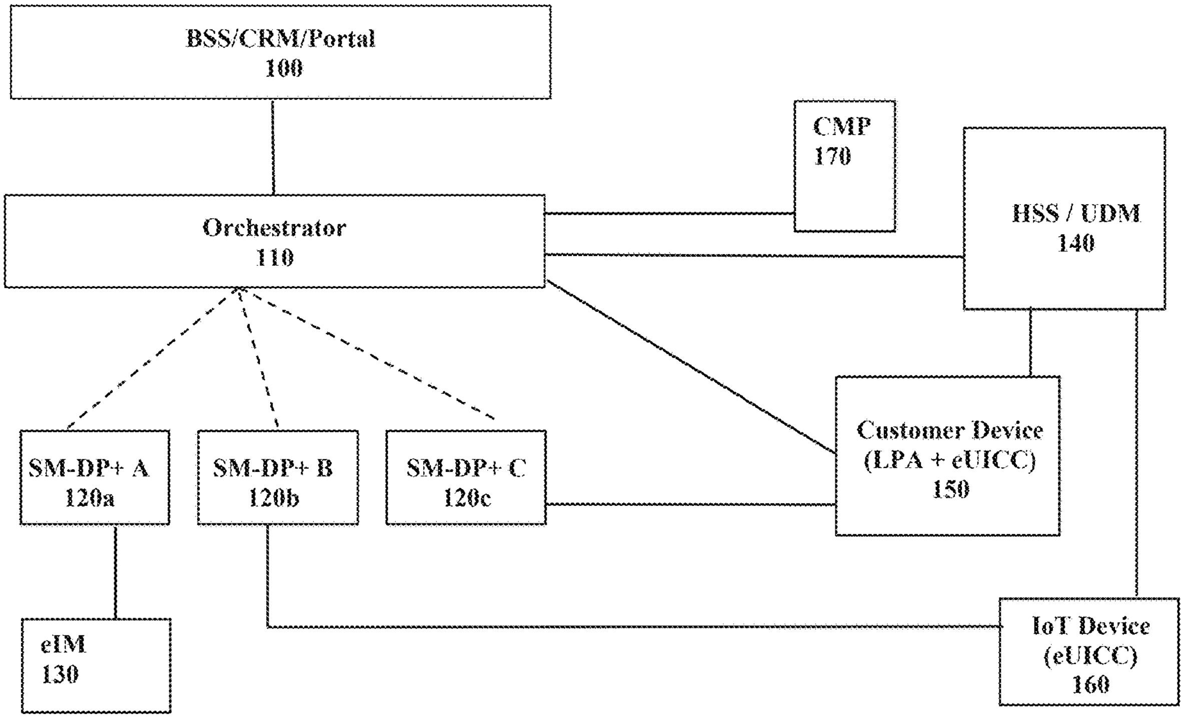
Figure 1: Logical representation of entities in eSIM profile orchestration

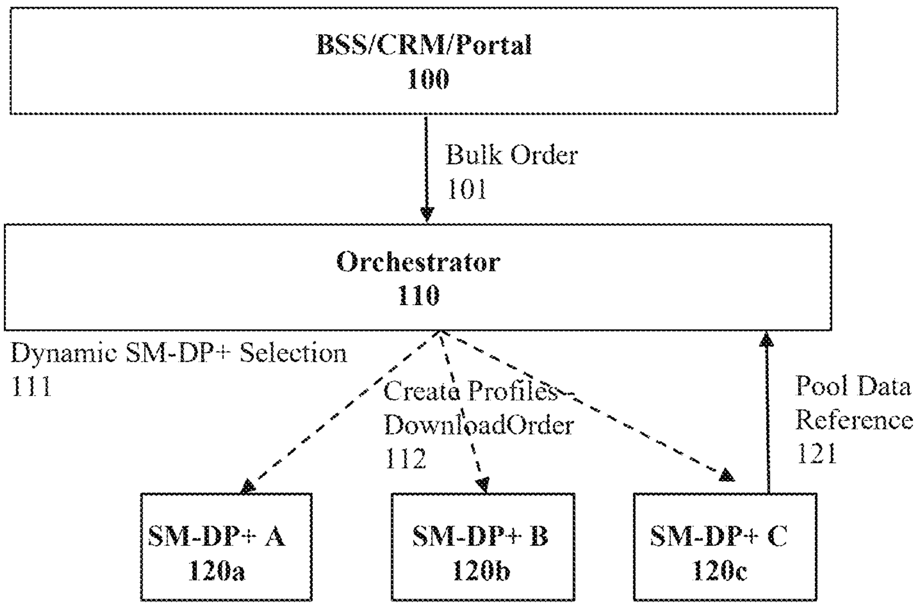
Figure 2: Representation of bulk order placement

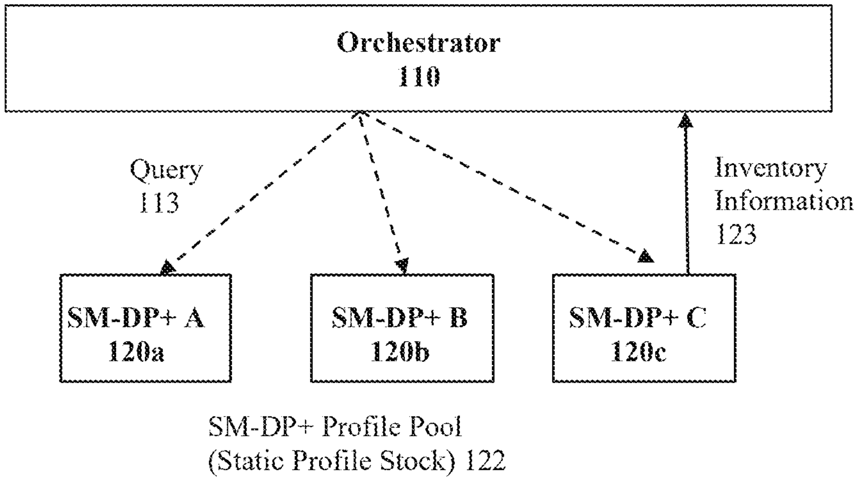
Figure 3: Representation of query of existing profile inventory

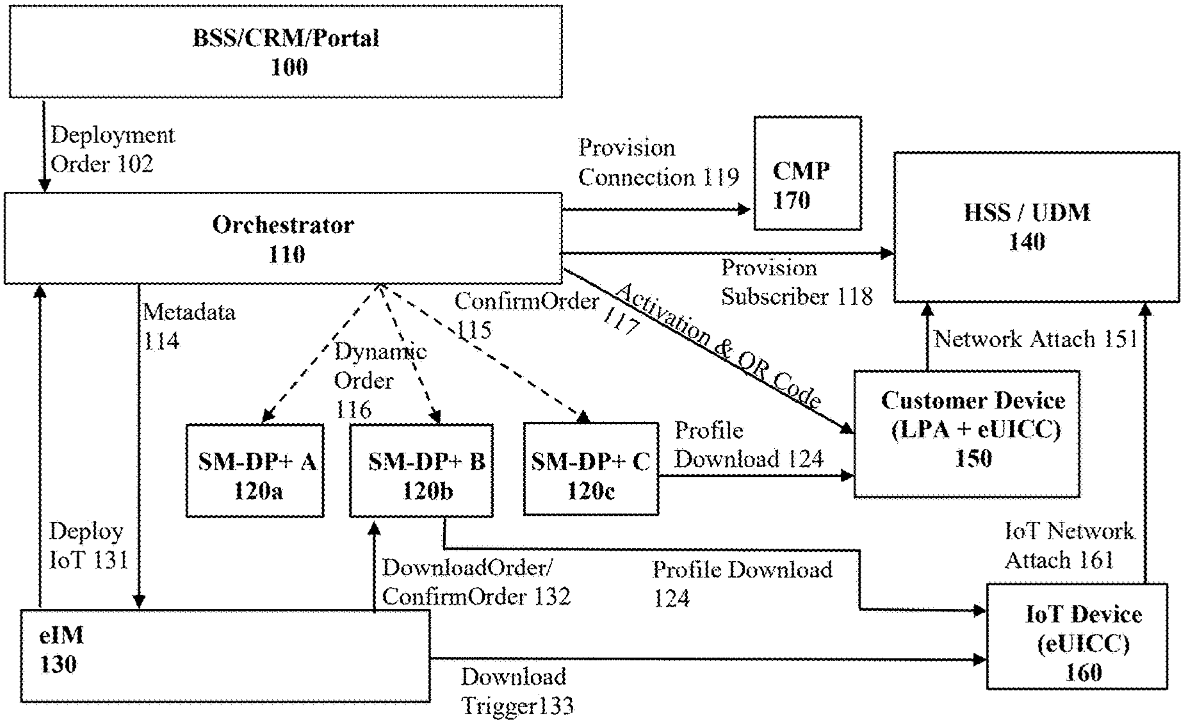
Figure 4: Representation of deployment order placement

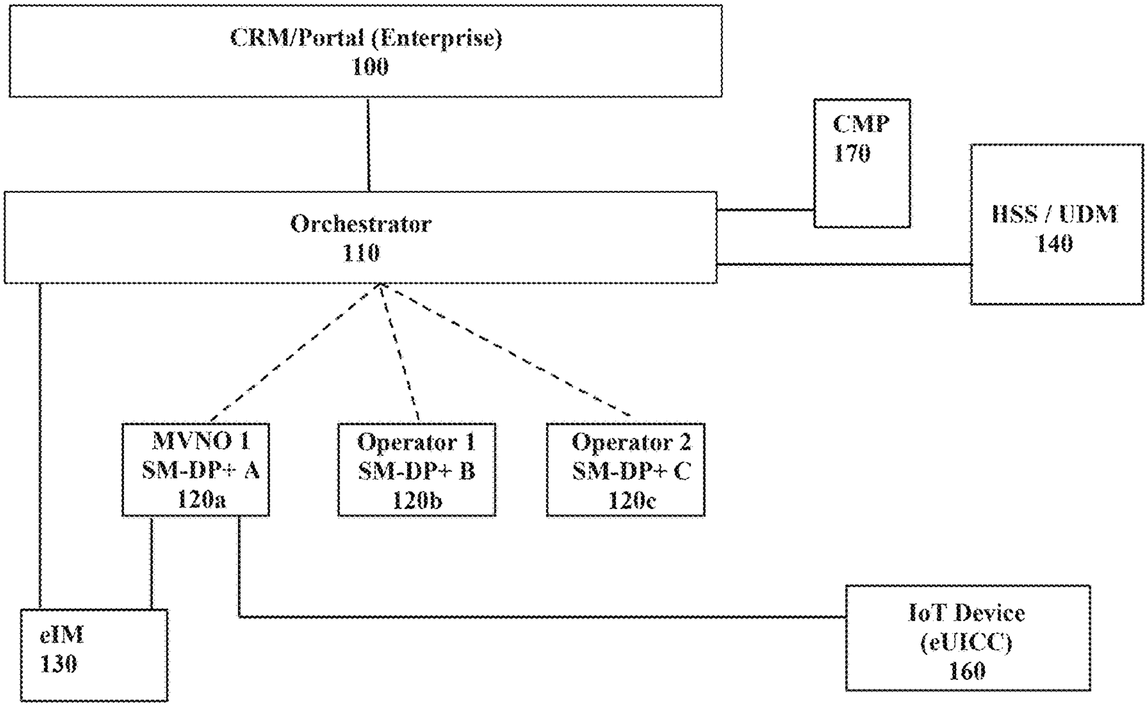
Figure 5: Logical representation of multi-operator pooling for IoT Enterprise

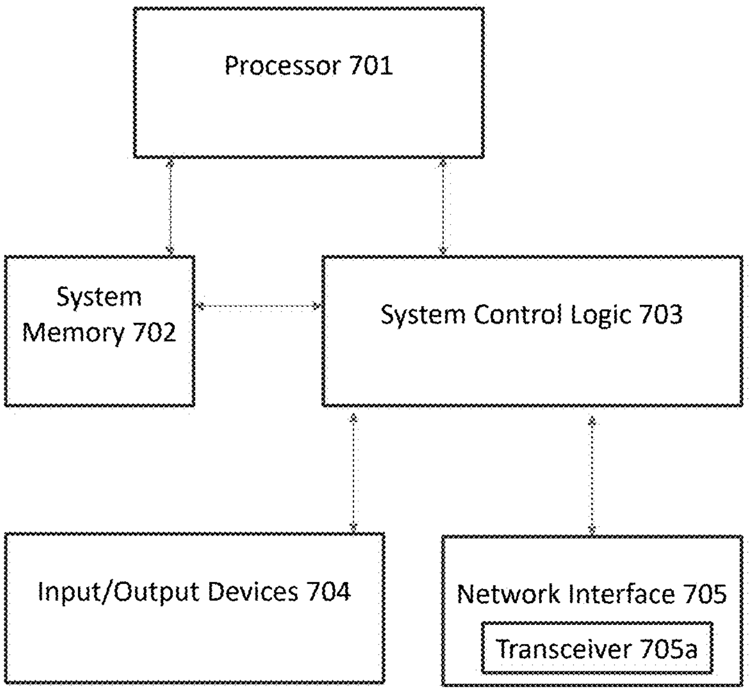
Figure 6: Logical representation of computer implementation

SYSTEM AND METHOD FOR DYNAMIC eSIM ORCHESTRATION ACROSS MULTI VENDOR PLATFORMS

CROSS-REFERENCE TO RELATED APPLICATIONS

Not applicable.

STATEMENT REGARDING FEDERALLY SPONSORED RESEARCH OR DEVELOPMENT

The invention described herein was not made under federally sponsored research or development. No government rights apply.

REFERENCE TO SEQUENCE LISTING, LARGE TABLE, OR COMPUTER PROGRAM LISTING APPENDIX

Not applicable.

FIELD OF THE INVENTION

The present invention relates generally to the field of software automation and more particularly, to systems and methods for managing remote SIM provisioning (RSP) for embedded subscriber identity module (eSIM) profiles in Telecommunications. The invention provides techniques for dynamically orchestrating eSIM profiles across multiple Subscription Manager-Data Preparation Plus (SM-DP+) platforms serving both consumer and IoT devices.

BACKGROUND

Under the GSM Association (GSMA) specifications for consumer devices (SGP.22) and Internet-of-Things (IoT) devices (SGP.32), encrypted eSIM profile packages are stored on SM-DP+ servers. Operators procure profile inventory from different vendors, and each vendor operates its own SM-DP+ server with a separate pool of profile identifiers (e.g., ICCIDs and IMSIs) and associated cryptographic keys. When operators purchase eSIM stock from multiple vendors, the inventory becomes fragmented across pools. Today operators route customer orders to specific SM-DP+ servers using static rules or ICCID ranges, which can exhaust some pools while leaving others underutilized. Subscriber records are often provisioned in the Home Subscriber Server/Unified Data Manager (HSS/UDM) in anticipation of profile downloads, consuming licensing resources even if the profiles remain unused.

Several drawbacks arise from this static allocation model: (a) pool exhaustion and under-utilization of other pools; (b) vendor lock-in caused by routing orders to particular SM-DP+ servers; (c) inefficiency from pre-provisioning subscriber records before profiles are allocated; and (d) fragmentation between consumer and IoT RSP flows. Prior art includes meta-RSP platforms that aggregate multiple vendors but require device-side selection (e.g., U.S. Pat. No. 10,939,268) and remote provisioning nodes focused on dynamic profile generation (e.g., US 2019/0181901 A1). These systems either rely on device-side selection or treat each SM-DP+ server separately and do not create a unified logical pool accessible through a single backend API. There remains a need for a backend orchestration layer that virtualizes multiple SM-DP+ inventories into a logical pool, enables late binding of vendor choice and deferred HSS/UDM provisioning, and unifies consumer and IoT workflows.

SUMMARY OF THE INVENTION

The invention provides an orchestration layer ("orchestrator") that interfaces with multiple vendor-operated SM-DP+ servers and an IoT remote manager (eIM) to create a unified logical pool of eSIM profiles. The orchestrator receives bulk profile procurement requests independent of any subscriber or device and selects one or more SM-DP+ servers based on policy rules (e.g., inventory availability, geographic region, cost or service-level agreements). It issues DownloadOrder and ConfirmOrder commands to allocate batches of profiles at the selected SM-DP+ servers. Instead of storing the encrypted eSIM profiles or keys, the orchestrator records metadata for each allocated profile (such as profile type, vendor identifier, order identifier, batch number and availability status) into a logical pool. Procurement timing is decoupled from deployment timing, allowing operators or enterprises to stock inventory in advance without assigning the profiles to particular devices or subscribers.

When a deployment request is later received from an operator's business support system (BSS) or customer relationship management (CRM) system for a consumer device, the orchestrator determines whether the request references a previously executed procurement order. If a reference identifier is present, the orchestrator allocates an eSIM profile from the corresponding logical pool. If the reference identifier is absent or the referenced pool is exhausted, the orchestrator dynamically selects an SM-DP+ server according to policy and allocates a profile from that server. The orchestrator then constructs an activation code by concatenating the selected SM-DP+ fully qualified domain name (FQDN) with the matching identifier and returns a QR code to the BSS for delivery to the customer. It triggers subscriber provisioning in the HSS/UDM only after the profile is allocated, reducing unused subscriber records.

For headless IoT devices, deployment requests are received from an eSIM IoT Manager (eIM). The orchestrator selects an SM-DP+ server using the same policy rules and returns metadata (e.g., SM-DP+ FQDN, profile type, regional restrictions and policy flags) to the eIM. The eIM then issues the GSMA ES2+ messages (DownloadOrder and ConfirmOrder) to the selected SM-DP+ server and manages device-side interactions such as ESipa messages and CoAP/ASN.1 translation. The orchestrator does not communicate with the IoT device; it only manages bulk procurement, policy-based selection and HSS/UDM provisioning. In some IoT deployments where a Connectivity Management Platform (CMP) handles subscription management, the orchestrator updates the CMP with details of the allocated eSIM profile.

Additional features include cross-vendor analytics and adaptive policy updates. The orchestrator aggregates statistics across vendors, such as success rates, latency, error codes and inventory consumption. It applies analytics to adjust policy weights (e.g., prefer vendors with lower latency or cost) and generates alerts when inventory levels fall below thresholds. The orchestrator also distinguishes between bulk procurement orders and deployment orders, allowing enterprises to pre-reserve inventory for large IoT deployments via reference identifiers and to dynamically source profiles when reserved pools are depleted. The orchestrator may be hosted by a trusted third party and aggregate SM-DP+ platforms from multiple mobile network operators or mobile virtual network operators, providing enterprises with a single interface for procuring profiles across heterogeneous providers and scoping pools via reference identifiers to specific projects.

BRIEF DESCRIPTION OF THE DRAWINGS

FIG. 1 illustrates an embodiment of the orchestration system architecture, showing the orchestrator interfacing with multiple SM-DP+ servers, BSS/CRM, eIM, HSS/UDM/CMP, and example consumer/IoT devices.

FIG. 2 illustrates the bulk profile procurement flow and logical pool creation.

FIG. 3 illustrates existing inventory import/synchronization into the logical pool.

FIG. 4 illustrates deployment flows, including reference-based allocation and dynamic fallback.

FIG. 5 illustrates enterprise multi-operator/MVNO aggregation by the orchestrator.

FIG. 6 provides a logical block diagram of computer implementation of the orchestrator.

DETAILED DESCRIPTION OF THE INVENTION

FIG. 1 illustrates an embodiment of the orchestration system showing the orchestrator 110 interfacing with multiple SM-DP+ servers, business systems, an eIM, and example devices. The BSS/CRM/Portal [100] communicates with the orchestrator [110] that virtualizes a pool of SM-DP+ servers (SM-DP+ A, SM-DP+ B and SM-DP+ C [120]). An eSIM IoT Manager (eIM) [130] manages device-side operations for IoT devices. A Home Subscriber Server/Unified Data Manager (HSS/UDM) [140] or Connectivity Management Platform (CMP) [170] provides subscription management for the network, a customer device with a local profile assistant (LPA) and eUICC [150] and an IoT device with an eUICC [160].

Architecture—The orchestrator is implemented as a software service hosted by a wireless operator or a trusted third party. It provides API(s) that expose endpoints for bulk procurement, deployment and analytics. The orchestrator maintains a registry of SM-DP+ vendors, each identified by a vendor identifier, SM-DP+ FQDN, supported profile types (e.g., consumer, IoT, regional variants), cost models and available inventory. The orchestrator does not store cryptographic keys or profile payloads; rather, it stores metadata about each profile. The metadata includes fields such as:

- ICCID range and quantity—Assigned when profiles are imported from a vendor.
- Profile type—Consumer (SGP.22) or IoT (SGP.32) and product code (e.g., prepaid, post-paid, private LTE).
- Region or network—The network on which the profile operates (e.g., North America, Europe).
- Batch and order identifiers—Identifiers used to correlate profiles with procurement orders.
- Availability state—States such as "available," "allocated," "activated", "expired", "released", or "deleted".

Policy engine—A rule engine selects an appropriate SM-DP+ server at procurement and deployment time. Policies may weight criteria such as:

- Inventory availability—The number of available profiles at each SM-DP+ server.
- Geographic fit—Prefer servers with profiles for the region associated with a deployment request.
- Latency—Average profile download latency observed from prior orders.
- Cost—Procurement or transaction costs charged by each vendor.
- Service-level agreements—Commitments such as maximum failure rate or time-to-download.
- Regulatory restrictions—Compliance with eSIM regulations (e.g., local network requirements).

Policies may be expressed as weighting functions or as boolean predicates. For example, a policy might assign weights to each vendor based on remaining inventory percentage, average latency and cost per profile, and select the vendor with the highest score. Policies may adapt over time based on analytics.

Bulk procurement (SGP.22 and SGP.32)—FIG. 2: illustrates Bulk Order [101] can be placed by operator BSS, CRM or a Portal. Alternatively, it can be placed by IoT Enterprise CRM or Portal. Finally, it can also be placed by Portal provided by the Orchestrator itself.

Any of these can send a bulk order request to the orchestrator with parameters including the desired number of profiles, profile type, and any regional restrictions. The orchestrator's policy engine determines one or more SM-DP+ servers dynamically based on policy [111] to fulfil the request. It issues GSMA ES2+ DownloadOrder [112] requests to those servers and receives identifiers as a reference for the created pool, "Pool Data Reference" [121]. The orchestrator records metadata for each allocated profile into the logical pool without storing cryptographic keys. The procurement system may specify an order reference identifier; the orchestrator associates the imported profiles with that reference for later deployment.

In some embodiments, the orchestrator supports existing deployments by importing or synchronizing metadata for pre-existing eSIM profiles from one or more SM-DP+ servers. As shown in FIG. 3: Orchestrator issues Query [113] to SM-DP+ (s). They assess their Static Profile Pool [122] and respond with Inventory Information [123]. This may be achieved through manual uploads, vendor-specific inventory query APIs, periodic polling, or event notifications, allowing the logical profile pool to virtualize stock allocated outside the orchestrator without immediate rerouting of legacy procurement systems. Once imported, these profiles are treated equivalently in the logical pool for policy-based selection during deployment requests.

Consumer deployment (SGP.22)—As shown in FIG. 4: Orchestrator receives a Deployment Order [102] from BSS/CRM/Portal with deployment details (e.g., product type and region). If Orchestrator sees availability in previously created profile pool, it would issue ConfirmOrder[115] to applicable SM-DP+ for profile download towards a consumer device otherwise it will create profile dynamically, Dynamic Order [116]. The orchestrator forms a GSMA activation code by concatenating the SM-DP+ FQDN and the matching identifier, encodes it as a Activation & QR code [117], and routes through the BSS, to the consumer device using which it can contact the right SM-DP+ and complete Profile Download [124]. Orchestrator will then initiate Provision Subscriber [118] towards HSS/UDM for the consumer. Only after this, the Orchestrator will initiate Provision Subscriber [118] towards HSS/UDM thereby reducing wasted subscriber licenses. After this the Consumer device and IoT device can perform Network Attach [151].

IoT deployment (SGP.32)—In case of IoT, Orchestrator can receive Deploy IoT [131] request from eIM which could be a batch order. It Orchestrator sees availability, it will provide Metadata [114] to eIM with SMDP+'s FQDN and reference information. eIM will then issue ES2+ orders (DownloadOrder/ConfirmOrder) to said SM-DP+ to bind profiles to IoT devices. eIM will then send Download Trigger [133] to IoT device(s) with SM-DP+ FQDN and other data using which the IoT device can contact the right SM-DP+ and complete Profile Download[124] using ESipa protocol. The orchestrator does not translate CoAP/ASN.1; this translation occurs within the eIM. After allocation, the orchestrator instructs the HSS/UDM to provision subscriber records for the allocated profiles. Alternatively, it can initiate Provision Connection [119] towards CMP when the operator has deployed CMP to manage IoT subscription. After this the IoT device can perform IoT Network Attach [161] respectively. Deployment requests may include a reference identifier to allocate from a pre-reserved pool. If multiple IoT devices are activated in a batch, the orchestrator supports batch allocation and returns metadata for each device in a single response.

In enterprise scenarios, the orchestrator enables multi-operator pooling, where bulk procurement requests from enterprise systems trigger allocations across diverse SM-DP+ servers, with resulting metadata added to enterprise-specific logical pools. FIG. 5: illustrates multi-operator/Mobile Virtual Network Operator (MVNO) pooling for IoT Enterprise where in Orchestrator fronts their respective SM-DP+ (s) for an enterprise's ordering and deployment process.

Analytics and adaptive policies—The orchestrator aggregates metrics such as average download latency, success/failure rates, inventory utilization and cost per profile. It maintains a monitoring dashboard and may expose a GET/analytics API. Policy weights may be adjusted based on these metrics; for example, the orchestrator may reduce the weight for a vendor exhibiting high failure rates or latency. When inventory levels drop below thresholds, the orchestrator automatically triggers alerts or initiates new bulk procurement requests.

Security and compliance—The orchestrator preserves the GSMA-defined security boundaries by never storing or transmitting cryptographic credentials. It interacts with SM-DP+ servers only via the standard ES2+ interface and does not retain keys or profile payloads. All API communications are authenticated and encrypted using TLS. Audit logs record all procurement and deployment actions for regulatory compliance. Access controls restrict operations based on roles (e.g., procurement, deployment, analytics).

The invention claimed is:

1. A computer-implemented method, comprising:

(a) receiving, by an orchestration platform executing on at least one processor, a bulk profile procurement request that is independent of any device or subscriber;

(b) selecting, using a policy engine, one or more Subscription Manager-Data Preparation Plus (SM-DP+) servers from a plurality of SM-DP+ servers, wherein the policy engine applies at least one criterion selected from inventory availability, geographic region, latency, cost, service-level agreement or regulatory restriction;

(c) causing allocation, via GSMA DownloadOrder and ConfirmOrder messages, of a plurality of eSIM profiles at the selected SM-DP+ servers;

(d) storing, by the orchestration platform, metadata corresponding to the allocated plurality of eSIM profiles in a logical profile pool, the metadata comprising at least profile type, vendor identifier, batch or order identifier and availability state, and excluding cryptographic key material and eSIM profile payload data;

(e) maintaining the logical profile pool separately from subscriber provisioning so that timing of profile procurement is decoupled from timing of profile deployment; and (f) providing an interface to query inventory levels and analytics for the logical profile pool.

2. The method of claim 1, wherein the bulk profile procurement request includes a reference identifier, and the metadata stored in step (d) associates each allocated profile with the reference identifier for later deployment.

3. The method of claim 1, wherein allocation of the plurality of eSIM profiles is distributed across multiple vendors according to the policy engine and comprises issuing DownloadOrder and ConfirmOrder messages to a plurality of SM-DP+ servers.

4. The method of claim 1, further comprising monitoring, by the orchestration platform, metrics for each SM-DP+ server selected in step (b), including download latency, success rate and cost, and dynamically adjusting policy weights based on the metrics.

5. The method of claim 1, further comprising exposing an application programming interface (API) through which an operator can request bulk procurement, query inventory and receive alerts when the logical profile pool reaches a threshold and automatically initiating a new bulk profile procurement request.

6. The method of claim 1, further comprising importing or synchronizing metadata corresponding to pre-existing eSIM profiles from the plurality of SM-DP+ servers into the logical profile pool.

7. A system, comprising at least one processor and memory storing instructions that, when executed by the at least one processor, cause the system to perform the method of claim 1.

8. The system of claim 7, wherein the system is further configured to allocate an eSIM profile from a logical profile pool based on a reference identifier, or dynamically select an SM-DP+ server in the absence of the reference identifier.

9. A non-transitory computer-readable medium storing instructions that, when executed by a processor, causes it to perform the method of claim 1.

10. The non-transitory computer-readable medium of claim 9, wherein the instructions, when executed, cause the orchestration platform to allocate an eSIM profile from a logical profile pool based on a reference identifier, or dynamically select an SM-DP+ server in the absence of the reference.

11. The method of claim 1, wherein the orchestration platform preserves GSMA-defined security boundaries by not storing or transmitting cryptographic credentials and by enforcing authenticated, encrypted communication with SM-DP+ servers and enterprise systems.

12. A computer-implemented method, comprising:

(a) receiving, by the orchestration platform, a deployment request associated with activation of a device;

(b) determining whether the deployment request includes a reference identifier corresponding to a previously executed bulk profile procurement request;

(c) when the reference identifier is present, allocating an eSIM profile from a logical profile pool associated with the reference identifier;

(d) when the reference identifier is absent or the corresponding logical profile pool is unavailable or exhausted, dynamically selecting an SM-DP+ server according to a policy engine and allocating an eSIM profile from the selected server;

(e) constructing an activation artifact comprising an activation code formed by concatenating a fully qualified domain name of the selected SM-DP+ server with a matching identifier and, for consumer devices, encoding the activation code as a QR code; and (f) triggering subscriber provisioning in a Home Subscriber Server/Unified Data Manager (HSS/UDM) or Connectivity Management Platform (CMP) only after allocation of the eSIM profile.

13. The method of claim 12, further comprising at least one of: (a) importing or synchronizing metadata for pre-existing eSIM profiles into the logical profile pool; and (b) aggregating SM-DP+ servers from multiple mobile network operators or MVNOs.

14. The method of claim 12, wherein the deployment request is received from a business support system or customer relationship management system and the activation artifact is delivered to a customer device equipped with a local profile assistant (LPA).

15. The method of claim 12, wherein the deployment request is received from an eSIM IoT Manager (eIM) associated with an IoT device and allocation comprises returning selection metadata identifying the selected SM-DP+ server, profile type and applicable policy rules to the eIM.

16. The method of claim 14, wherein the orchestrator does not communicate with the IoT device and does not perform CoAP/ASN.1 translation, and wherein device-side protocol exchanges are performed by the eIM.

17. The method of claim 12, wherein the deployment request comprises a plurality of IoT devices and the orchestration platform performs batch allocation, providing selection metadata for each device in a single response.

18. The method of claim 12, further comprising, when the logical profile pool associated with the reference identifier is exhausted, dynamically sourcing an eSIM profile from any available SM-DP+ server and updating the metadata to reflect the allocation.

19. The method of claim 12, further comprising generating analytics for deployment requests, including success rates, latency and vendor utilization, and using the analytics to adjust policy parameters.

20. The method of claim 12, wherein triggering subscriber provisioning in step (f) comprises sending a request to the HSS/UDM or to CMP to create a subscription record only after the eSIM profile has been allocated.

* * * * *